INVENTOR.
MORTIMER D. ROGERS
BY
Dewey J. Cunningham
ATTORNEY

May 3, 1960 M. D. ROGERS 2,935,619

DATA HANDLING SYSTEM

Filed Dec. 29, 1954 7 Sheets-Sheet 2

INVENTOR.
MORTIMER D. ROGERS

BY Dewey J. Cunningham

ATTORNEY

*INVENTOR.*
MORTIMER D. ROGERS

*BY*

Dewey J. Cunningham
ATTORNEY

May 3, 1960 M. D. ROGERS 2,935,619
DATA HANDLING SYSTEM
Filed Dec. 29, 1954 7 Sheets-Sheet 4

INVENTOR.
MORTIMER D. ROGERS
BY
Dewey J. Cunningham
ATTORNEY

May 3, 1960 M. D. ROGERS 2,935,619

DATA HANDLING SYSTEM

Filed Dec. 29, 1954 7 Sheets-Sheet 5

*INVENTOR.*
MORTIMER D. ROGERS

*BY*
Dewey J. Cunningham
ATTORNEY

May 3, 1960 M. D. ROGERS 2,935,619

DATA HANDLING SYSTEM

Filed Dec. 29, 1954 7 Sheets-Sheet 6

*INVENTOR.*
MORTIMER D. ROGERS

*BY* Dewey J. Cunningham
ATTORNEY

May 3, 1960 M. D. ROGERS 2,935,619
DATA HANDLING SYSTEM
Filed Dec. 29, 1954 7 Sheets-Sheet 7

*INVENTOR.*
MORTIMER D. ROGERS
*BY*
Dewey J. Cunningham
ATTORNEY

United States Patent Office 2,935,619
Patented May 3, 1960

2,935,619

DATA HANDLING SYSTEM

Mortimer D. Rogers, Vestal, N.Y., assignor to International Business Machines Corporation, New York, N.Y., a corporation of New York Application December 29, 1954, Serial No. 478,430

19 Claims. (Cl. 250—233)

Figure 1A:
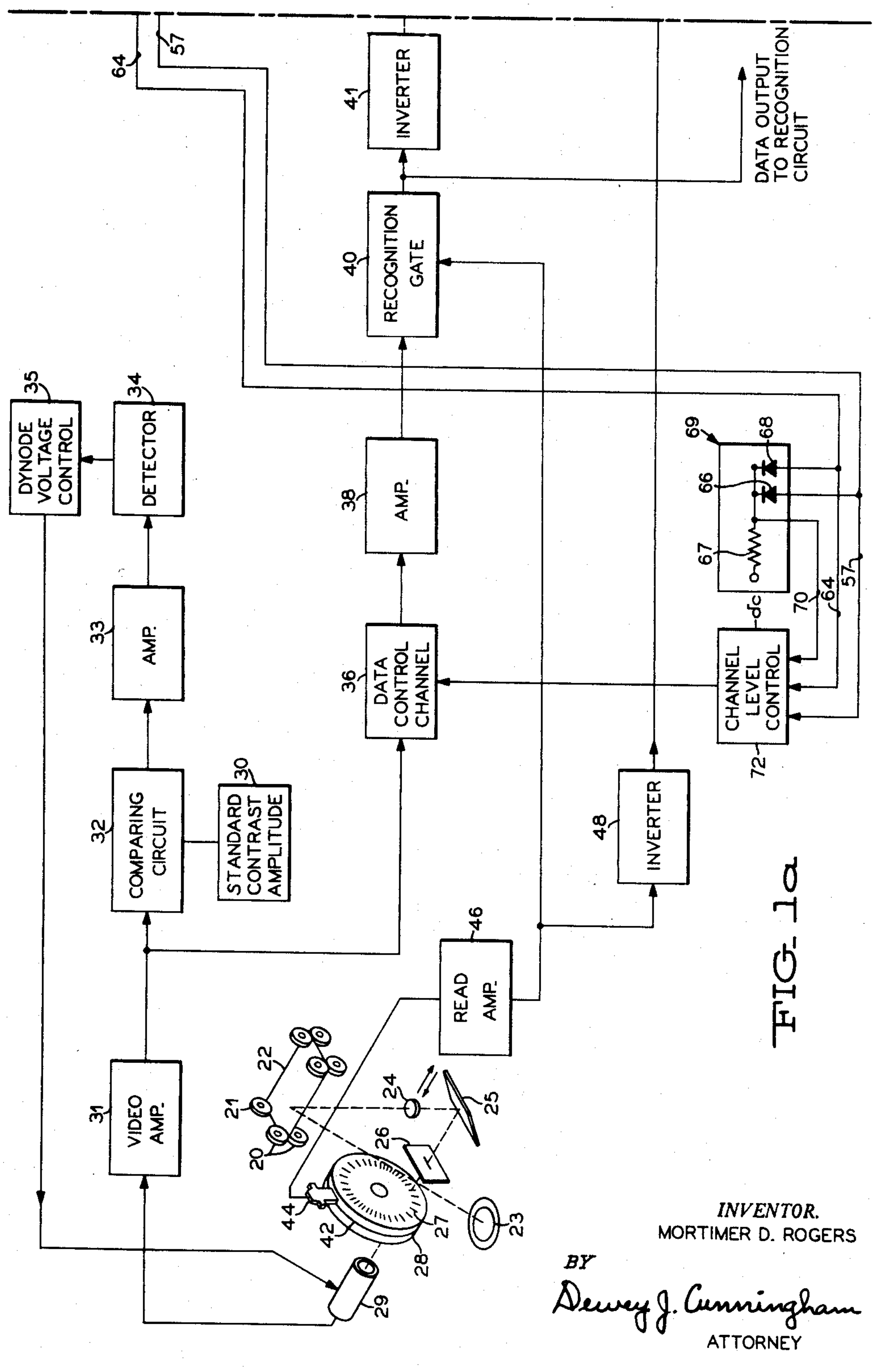

The present invention relates to a data handling or processing circuit capable of altering a data channel in such a manner as to vary the total information passing through the channel during time intervals when data presence is anticipated due to knowledge of the immediate history of data which has passed through the channel.

In the construction of apparatus for sensing graphic data by means of light sensitive devices the degree of success obtained depends on a large number of factors. A primary consideration is the quality of the data itself. Since the light sensitive device normally depends on the amount of light reflected from the graphic data and its background, the difference in light intensity reflected from the background and the data itself may become so small as to render the output from the light sensitive device unreliable or unusable. Of course, where the graphic data is always of the same density and the background is also always of the same density but considerably different from the data density, the problem is greatly simplified. As a practical matter, however, such conditions do not exist in actual practice. Even under these ideal conditions, however, there is still the problem of compensating for variations in intensity of the light source and variations in sensitivity of the light sensitive device for given intensities of light received thereby.

The difficulties set forth above are of major proportions in detecting or sensing graphic data such as letters or numerals which may be either printed or handwritten on a record. The kind of printed graphic data which it is normally desired to read is produced by typewriters. It will be obvious that each typewriter used will produce data of different densities. Not only is there a difference between the density of different characters but also a difference in density between portions of the same character. In addition to this, the characters may be on many different colored records or many different shades of the same color. Furthermore, it is not unusual to have record material with variable light reflectance characteristics. All of these situations create problems for the apparatus which is to use the data picked up in scanning the characters.

In addition to the above difficulties, variation in data illumination intensity, drift in photomultiplier characteristics and drift in video amplifier gain all tend to degrade the video data so as to make it unreliable.

Difficulty is also experienced in determining the proper level for clipping the data output from a photomultiplier for possible use by character recognition apparatus. Preset clipping levels have been used in the past so that all signals above this level pass through and those below the level do not. However, since the relative density and reflectance characteristics between the background and the character varies so much from record to record, as well as from character to character, the preset clipping level cannot provide reliable data at all times. Furthermore, most characters vary in density and outline width from one portion to another. If the preset clipping level is set to pick up the lighter character portions, too much data is picked up around the edges of the darker portions. On the other hand, if the preset clipping level is raised, the less dense portions of the character are lost. Thus, prior art devices have had to compromise between having darker areas of a character run together and the loss of lighter portions.

The present invention overcomes these difficulties by providing an arrangement whereby a scanning means scans characters on a document so as to furnish video data to a photomultiplier. The photomultiplier sees a totally black medium between scanning cycles. Therefore, the difference between the signal produced between scanning cycles and the signals produced during a scanning cycle becomes the signal contrast amplitude. The signal contrast amplitude, after being amplified and clamped, is compared with a standard contrast amplitude to produce an error signal which is equal to the difference therebetween. This error signal is used to provide a dynamic bias for the photomultiplier in a manner to tend to maintain the signal contrast amplitude equal to the standard contrast amplitude at the comparing device. The data control channel circuit is connected to receive the amplified photomultiplier output. In this circuit the relationship between the upper and lower clipping levels remains constant to produce a data channel. The data channel may be varied, to pass more or less video data, through a feed-back control which will be apparent hereinafter. The output from the data channel control circuit is connected to a gate circuit which receives sampling pulses. The presence of video data at the gate circuit at the time of the occurrence of a sampling pulse furnishes a pulse to a multi-stage shifting register. The data advances through the shifting register at the sampling pulse frequency. An arrangement is provided so that after a predetermined number of signals have been received in sequence in the first few stages of the register, a control signal is fed back to the data channel control circuit to lower the data channel. This may be described as looking for the vertical characteristics of a character. The data channel may remain lowered as long as consecutive bits of data are received. The shifting register may embody a number of stages equal to $n+1$ where $n$ is the number of times the video data is sampled during a scan. If the $n-1$, the $n$ or the $n+1$ stages contain data, it is known that data was present on a prior scan adjacent the point being scanned on the present scan. Thus, it is reasonable to assume that data will be present at this point on the current scan. Therefore, a presence of data in the $n-1$, $n$ or $n+1$ stage is used to lower the data channel in the data channel control circuit. This may be described as looking for the horizontal characteristics of a character.

An object of the present invention is to provide an improved circuit for use with a light sensitive device which is sensing data on a record medium, said circuit providing a constant contrast video signal regardless of changes in contrast between the data and the background.

Another object of this invention is to furnish a dynamic control circuit for a photomultiplier which scans graphic data on a record medium, said circuit being arranged to compensate the photomultiplier output signals for variations in data illumination intensity, drift in photomultiplier characteristics and drift in video amplifier gain.

Still another object of the present invention is to produce constant contrast amplitude video signals from a photomultiplier and to supply these signals to a variable level data channel which is arranged to increase or decrease the probability of the signals passing through the channel depending on the previous history of signal presence in the data channel.

A further object of this invention is to furnish apparatus for altering a data channel in such a manner as to increase the total information flow through the channel during time intervals when data presence is anticipated due to a knowledge of the immediate history of data which has passed through the channel.

A still further object of the invention is to provide a photomultiplier output circuit for taking data obtained from successively scanning graphic characters and increasing the flow of information through a data channel to a recognition circuit during times when horizontal characteristics of the character are anticipated to be present on a current scan due to their having been present on a prior scan.

Another object of the invention is to provide an improved data channel control circuit as described in the paragraph immediately above in which the total information flow through the data channel is increased in sensing the vertical characteristics of a character.

Other objects of the invention will be pointed out in the following description and claims and illustrated in the accompanying drawings, which disclose, by way of examples, the principle of the invention and the best mode, which has been contemplated, of applying that principle.

Figure 1B:
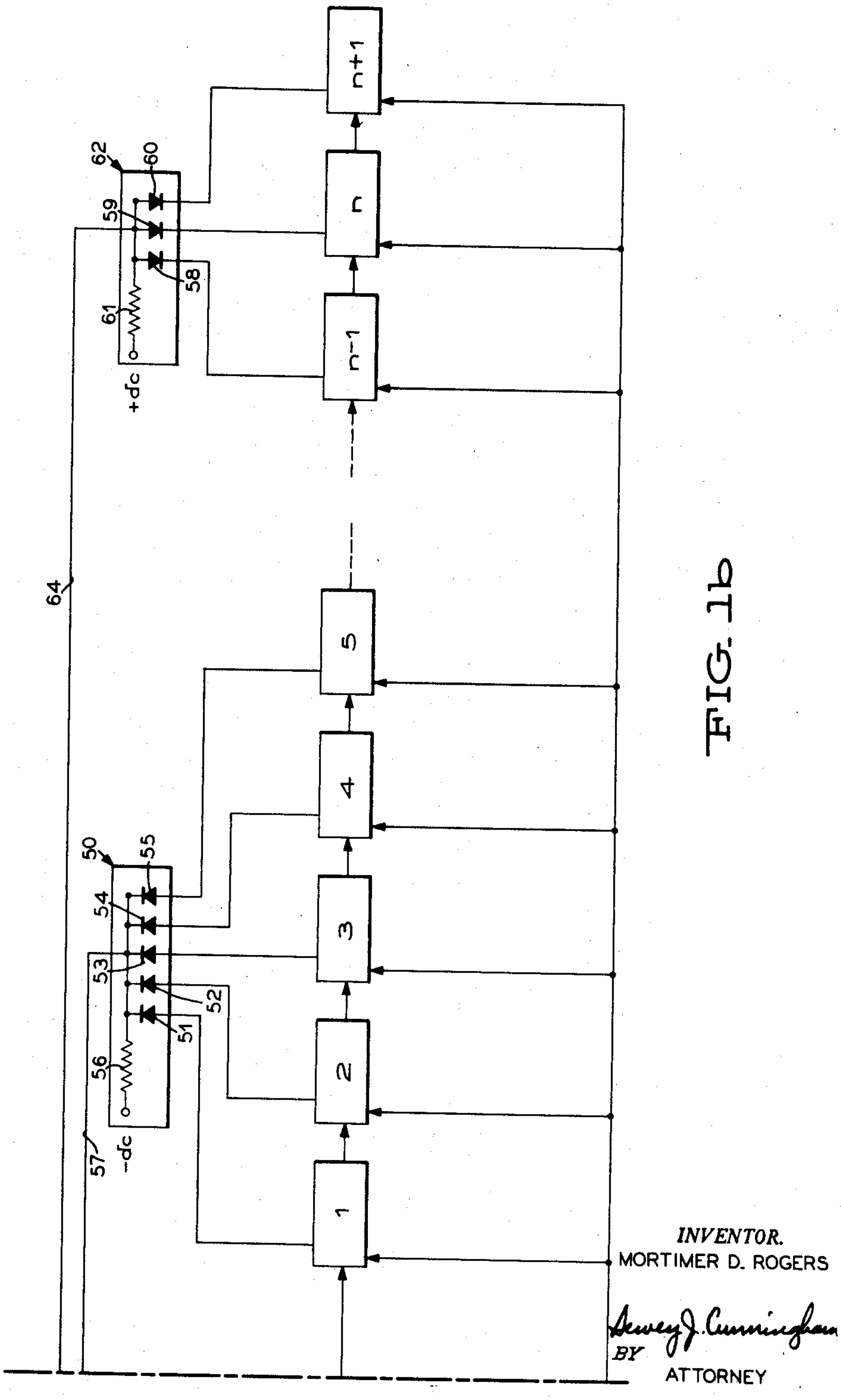
Figure 2A:
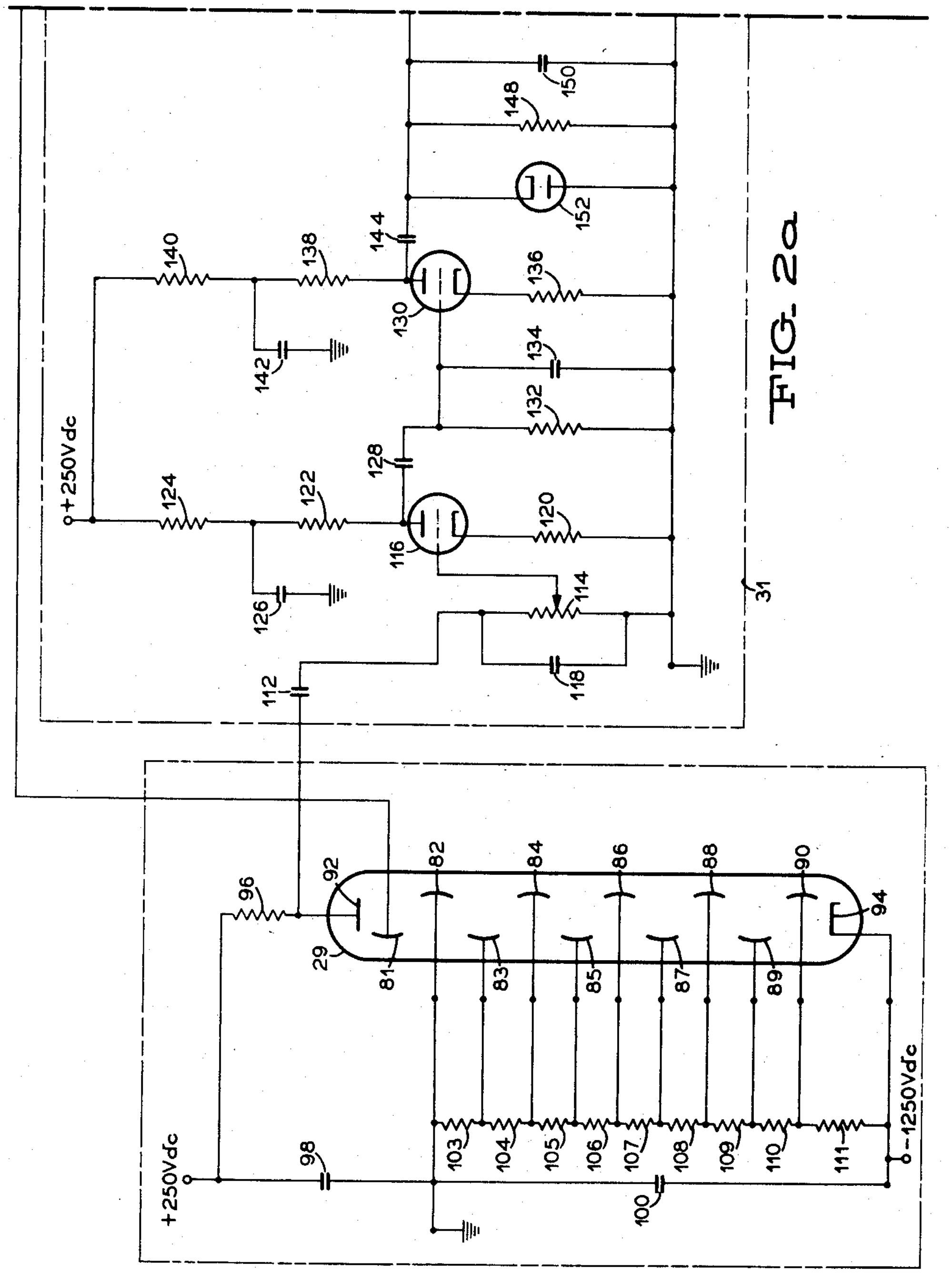
Figure 2B:
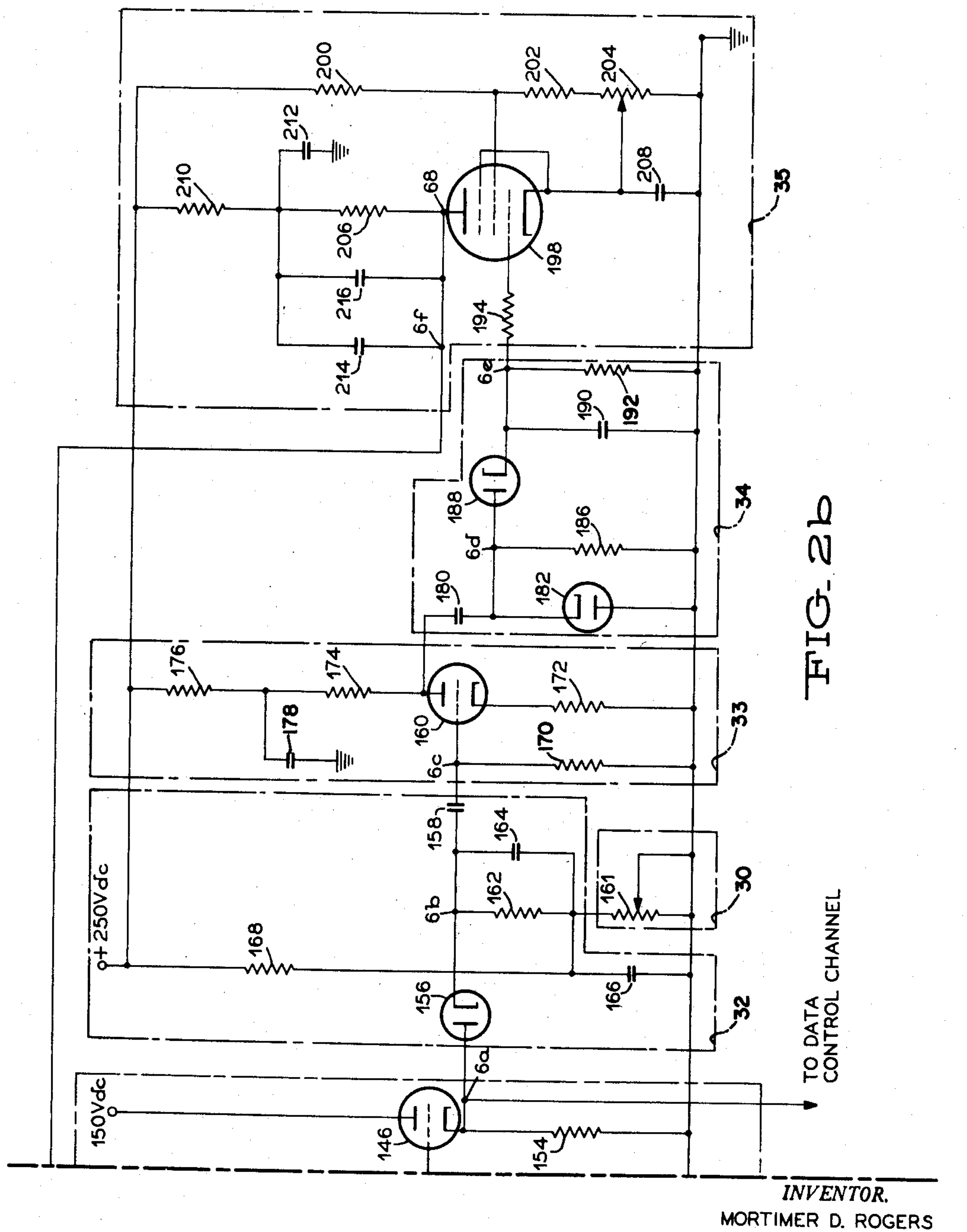
Figure 3:
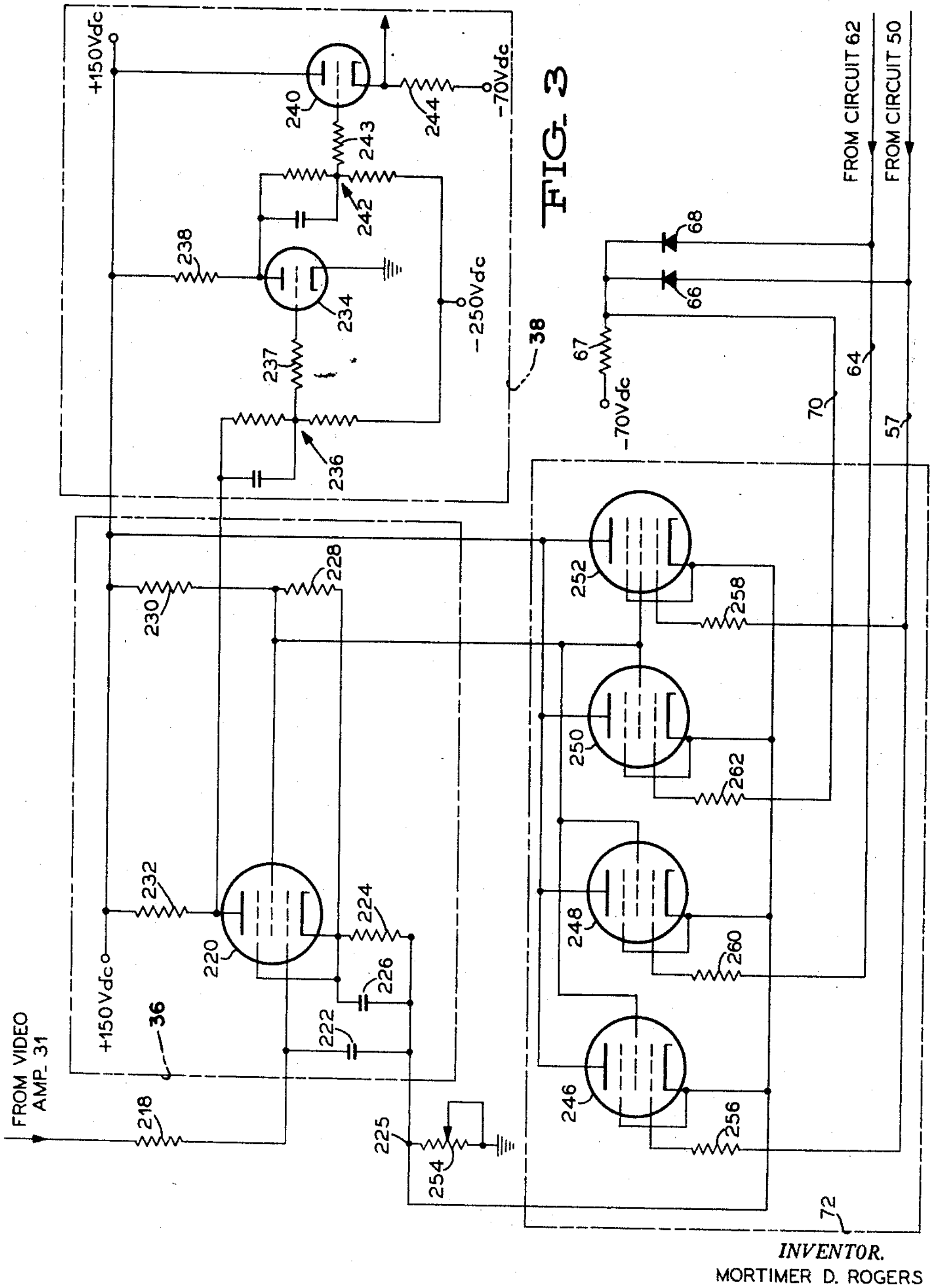
Figure 4A:
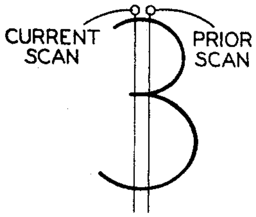
Figure 4C:
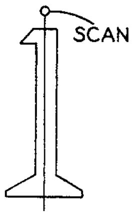
Figure 4B:
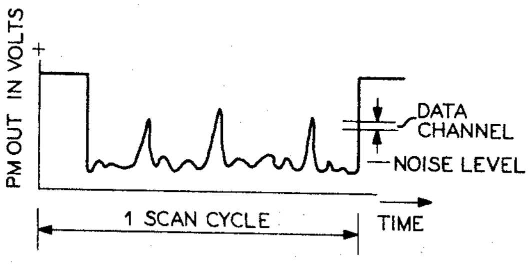
Figure 4D:
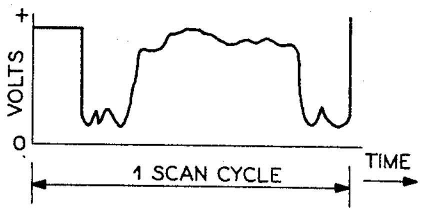
Figure 5A:
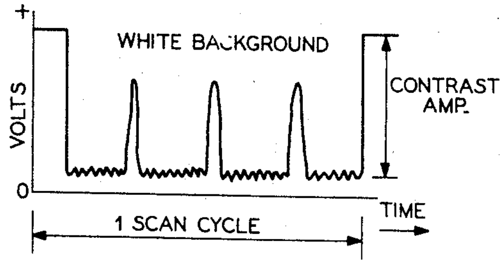
Figure 5C:
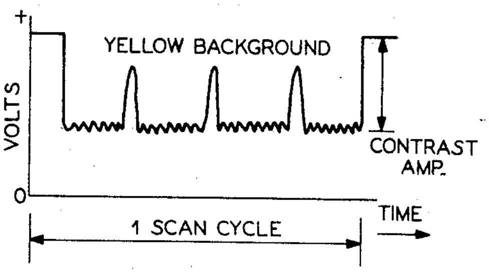
Figure 5B:
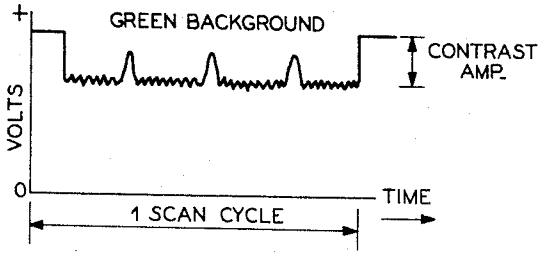
Figure 6A:
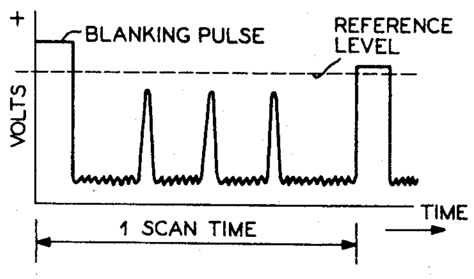
Figure 6B:
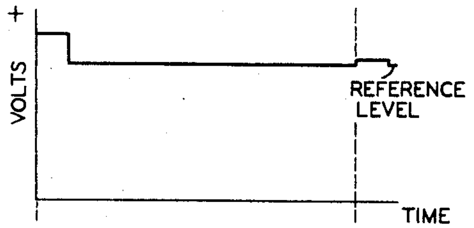
Figure 6C:
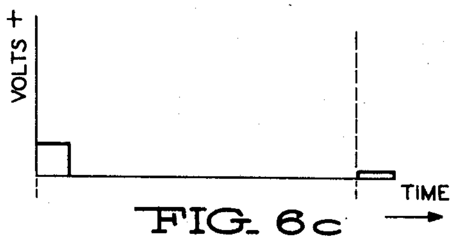
Figure 6D:
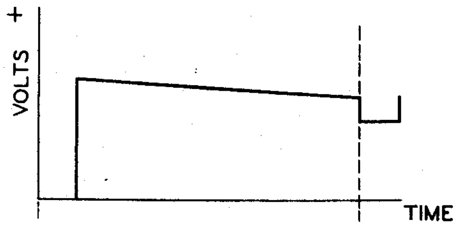
Figure 6E:
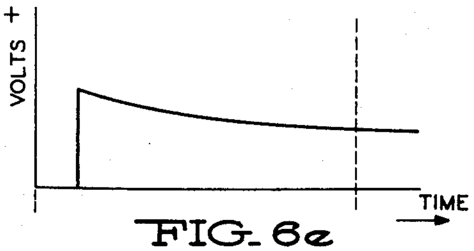
Figure 6F:
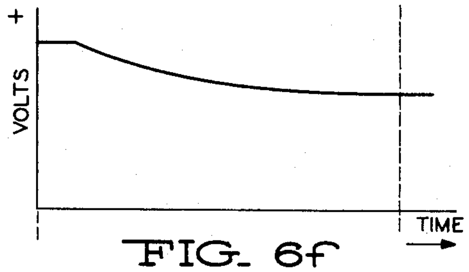
Figure 7A:
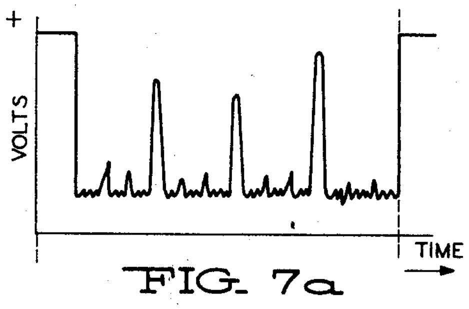
Figure 7B:
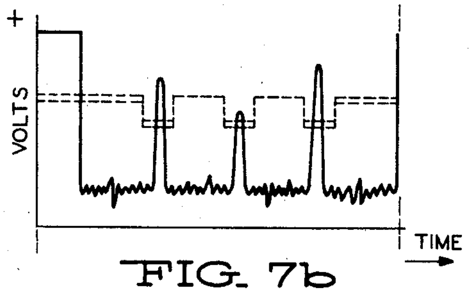
Figure 7C:
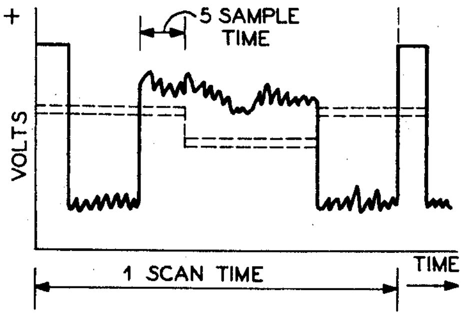

In the drawings:

Figs. 1*a* and 1*b*, when placed upright and in left to right order, respectively, show a block diagram of the present invention;

Figs. 2*a* and 2*b*, when placed upright and in left to right order, show a schematic diagram of the constant contrast amplitude control circuit;

Fig. 3 shows a schematic diagram of the data channel control circuit;

Figs. 4*a* and 4*c* show sample characters which produce the photomultiplier outputs shown in Figs. 4*b* and 4*d*, respectively;

Figs. 5*a*, 5*b* and 5*c* show sample wave forms obtained from a photomultiplier during one of the scans through the digit shown in Fig. 4*a* for different colored backgrounds without contrast control;

Figs. 6*a*, 6*b*, 6*c*, 6*d*, 6*e* and 6*f* show sample wave forms obtained at points **6*a*, 6*b*, 6*c*, 6*d*, 6*e* and 6*f*** in Figs. 2*a* and 2*b*, respectively; and Fig. 7*a* shows sample wave forms obtained on a first scan and Fig. 7*b* shows how the data channel is lowered to pick up horizontal characteristics of a character where they are anticipated, while Fig. 7*c* shows how the data channel is lowered in sensing vertical characteristics.

Referring to the block diagram of the present invention shown in Fig. 1*a*, an embodiment of a scanning apparatus has been shown which may be used in the present invention. Briefly, this scanning apparatus includes feeding means including a pair of feed rolls 20 which feed a record 22 to a position where it can be scanned. After the record is scanned it may be fed from the scanning station by a pair of feed rolls 21. A source of light 23 illuminates the characters printed on the under side of the record so that a lens system 24, which moves in the direction in which the characters on the record extend, can present a continuous series of moving character images via the angled mirror 25 to a stationary slit 26. As the succession of characters pass by the scanning slit, a rotating scanning disc 28 is used to scan the portion of a particular character which is present in the slit at a particular instant. This is accomplished by providing a plurality of spaced radial slits 27 near the periphery of disc 28. The light which gets through a radial slit as it moves from one end of the stationary slit to the other end is representative of the light reflected from the background. An absence or a near absence of light during this time is representative of a portion of the character presented to the stationary slit at this time. A photomultiplier 29 is mounted behind the disc to pick up the varying light intensities which pass through the stationary slit and a radial slit associated therewith. It will be apparent that other types of scanning apparatus, either mechanical or electrical, may be used to scan the characters. For example, the characters may be continuously moved through a high speed vertical scan obtained from a flying spot scanner, the arrangement being such that a plurality of successive vertical scans are made through the character to be read.

It will be seen that the intensity of light received by the photomultiplier varies between total darkness between scans of the character, and that reflected from the background, as well as that reflected from the character itself, the latter two of which depends on a number of factors, as outlined above. The reflectance characteristic of the background itself may change from record to record. In order to assure a constant contrast amplitude signal for a given density character regardless of background, the output from the photomultiplier is supplied to a video amplifier 31 where the signal is amplified and clamped to a predetermined potential to provide a contrast amplitude signal. The contrast signal is effectively the difference between the signal produced when the photomultiplier views total darkness and the signal produced in viewing the background. The narrow signals produced in sensing a portion of a character on the background has little effect on the contrast signal since they are of such short duration compared to the duration of the background signal and of relatively smaller amplitude. Reference shoulud be made at this time to Figs. 4*a*, 4*b*, 4*c*, 4*d*, 5*a*, 5*b* and 5*c*. Fig. 4*a* shows the character "3," by way of example, and Fig. 4*b* shows the photomultiplier output signal received on a current vertical scan. The signal for the prior scan is not shown but is substantially the same as that for the current scan. Fig. 4*c* shows the digit "1," by way of example, and Fig. 4*d* shows the photomultiplier output on a scan through the character. As shown, Fig. 4*a* illustrates a character having continuous horizontal characteristics and Fig. 4*c* illustrates a character having continuous vertical characteristics. Figs. 5*a*, 5*b* and 5*c* show typical output wave forms obtained on the current scan of the character "3" where the character is placed on records having white, green and yellow backgrounds, respectively. The character density is assumed to be the same on all three records. It will be seen that the contrast amplitude varies over a wide range where no compensation exists for record cards. The upper limit of the contrast amplitude is set by cutting off all light to the photomultiplier between scans. The lower limit is determined primarily by record color and reflectance characteristics, i.e., shiny, dull, etc.

The reason why this varying contrast is so undesirable is that before the data can be made useful for a recognition circuit, a data channel must be set up to pick up a signal level which is safe to accept as character data. If an effort were made to set a data channel level for the signals of Fig. 5*a* so that no undesired spurious signals would be obtained, this same data channel level would be useless for the signals shown in Fig. 5*b*. That is, the signals shown in Fig. 5*b* would never rise up to the data channel level and therefore would be completely missed. On the other hand, if the data channel were lowered to pick up the signals shown in Fig. 5*b* reliably, the signals shown in Fig. 5*a* would be lost in the noise signals. Thus, it is necessary to attempt to maintain a standard contrast amplitude.

The signals from amplifier 31 are fed to a comparing circuit 32 where the signal contrast amplitude, received from source 30, is compared with a standard contrast amplitude, and an output signal termed the error signal is produced which is the difference therebetween. The error signal is fed to amplifier 33 where it is amplified and clamped to a predetermined potential. The output from the amplifier is connected to a detector circuit 34 which rectifies and filters the signal for use by the dynode voltage control circuit 35. The output from circuit 35 is connected back to a dynode of the photomultiplier 29. The feed-back potential is of such a polarity and magnitude as to vary the gain of the photomultiplier until equilibrium in the comparing circuit 32 is reached, i.e., the signal contrast amplitude becomes equal to the standard contrast amplitude.

The regulated output from video amplifier 31 is connected to a data control channel circuit 36 where the signals are limited or clipped between variable upper and lower signal levels. The amplitude increment between the upper and lower signal levels remains fixed but they form a channel which can be moved up or down when desired. The output from circuit 36 is fed to amplifier 38 where it is amplified and connected to a recognition gate 40. Sampling pulses are furnished to the recognition gate in a manner now to be explained.

The periphery of drum 28 is furnished with a magnetizable surface 42 which has a magnetized timing track thereon. A read head 44 is arranged to be in position to be influenced by said timing track and to provide a plurality of pulses to a read amplifier 46. This read amplifier is of conventional construction and is well known in the magnetic drum art. The output from read amplifier 46 is a series of positive pulses which are connected to recognition gate 40 and used as the sampling pulses for the video data from amplifier 38.

The output pulses from read amplifier 46 are also connected to a conventional inverter 48 where they are inverted and connected to each stage of a conventional multi-stage shifting register, shown in Fig. 1*b*, as the shifting pulses therefor.

Referring to the recognition gate 40, the construction is conventional and may be of the gated amplifier or coincidence type of circuit. It is but necessary that when there is a coincidence of video data, i.e., a positive potential from amplifier 38, and a positive sampling pulse, there is a positive output pulse passed from the recognition gate through a conventional inverter 41 to the first stage of said shifting register.

The stages of the shift register are numbered 1, 2, 3, 4, 5 . . . $n-1$, $n$ and $n+1$ where $n$ is equal to the number of sampling pulses which occur during a single scan. The data is stepped along the shift register at the same rate as the sampling rate. Thus, the $n+1$ stage and the 1st stage contain data at all times produced by laterally adjacent points on a prior scan and a current scan, respectively. The operation of the shift register is according to well-known principles. The shift register may also be of the type shown and described in patent application Serial No. 469,895 for Shifting Registers, filed November 19, 1954, by G. L. Clapper and assigned to the same assignee as the present invention.

In any event, if a stage is turned "on," a negative potential is available from the left side thereof which indicates the presence of character data therein. The shifting pulses from inverter 48 shifts the data from stage to stage out of phase but at the same frequency as the data input to the register.

A negative "and" circuit, which may also be termed a coincidence circuit, is illustrated by the reference numeral 50 in Fig. 1*b*. The inputs for this circuit come from a number of the first few stages of the shift register. By way of example, the potentials which exist on the left sides of stages 1, 2, 3, 4 and 5 are connected to the plates of diodes 51, 52, 53, 54 and 55, respectively. The cathodes of all diodes are commoned and connected through a resistance 56 to a negative source of potential. The arrangement is such that if data is present in each of stages 1 through 5, a negative potential exists on the left sides thereof. Therefore, none of the diodes can conduct and the potential at the commoned cathodes becomes the negative source potential. However, if any one of the stages provides a positive potential to the plate of the diode associated therewith, the diode conducts and pulls up the potential at the common line connecting the cathodes of the diodes above the negative potential source. Thus, a potential exists across resistor 56. The negative potential which exists on the commoned cathodes connects to a feed-back line 57 for control purposes. This negative potential indicates that at least five consecutive bits of character data have been received. The logic of the present invention is such that this is taken as an indication of a vertical characteristic of a character. The negative potential can be used to lower the data channel to allow a closer look at the incoming data. It should be understood that the circuit could be arranged to require more or less than five consecutive bits of character data before lowering the data channel. For example, if it should be desired to require seven consecutive bits before lowering the data channel, seven diodes connected to the first seven stages would be provided.

The $n-1$, $n$ and $n+1$ stages of the shifting register also have negative potentials at the left side thereof if there is character data in the stage. It is desired to lower the data control channel if there is a presence of data in any of stages $n-1$, $n$ and $n+1$, the reason being that data was seen at or near the point now being scanned on a prior scan and it is possible that data is present on the current scan. This may be termed as looking for horizontal characteristics of a character.

To accomplish lowering of the data control channel, the cathodes of diodes 58, 59 and 60 are connected to the left sides of stage $n-1$, $n$ and $n+1$, respectively. The plates of the diodes are commoned and connected through a resistor 61 to a negative source of potential. These diodes, in the arrangement described, form a negative "or" circuit for the signals from the stages associated therewith, this circuit being illustrated generally by numeral 62.

The arrangement in circuit 62 is such that if any or all of stages $n-1$, $n$ and $n+1$ contain character data, a negative potential exists on the common line connecting the diodes, this negative potential being connected to feed-back line 64 for control purposes. It should be pointed out that if it should be desired to lower the data channel earlier and keep it open longer, an additional stage $n+2$, by way of example, could be provided. Under these circumstances additional diodes could be provided in the negative "or" circuit 62, there being one diode connected to each of stages $n-2$ and $n+2$.

Referring now to Fig. 1*a*, the potentials on lines 57 and 64 are connected to the plates of diodes 66 and 68, respectively. The cathodes of the diodes are commoned and connected through a resistor 67 to a negative source of potential. These diodes and associated elements form a negative "and" circuit 69. It provides a negative potential on line 70 when there is a coincidence of negative signals on lines 57 and 64.

The signals on lines 57, 64 and 70 are fed to a channel level control circuit 72. The presence of a negative signal on any one of the lines contributes toward lowering the level of the data channel in the data control channel circuit 36 an incremental amount. That is, if either of lines 57 or 64 are negative, then the level is lowered an incremental amount. If both of lines 57 and 64 are negative, then line 70 will also be negative and the level will be lowered by another incremental amount.

Keeping in mind the logical operation of the present invention as described above in terms of the block diagram shown in Figs. 1*a* and 1*b*, an explanation will now be given relative to the circuits within some of the blocks. Figs. 2*a* and 2*b* show a schematic diagram of the photomultiplier and its associated power supply circuitry and the automatic signal contrast control circuit shown in Fig. 1*a*.

The photomultiplier 29 comprises a plurality of dynodes illustrated by reference numerals 81, 82, 83, 84, 85, 86, 87, 88, 89 and 90, as well as a plate 92 and a cathode 94. The plate is connected through a resistance 96 to a positive source of potential, shown by way of example as +250 v. D.C. The cathode is connected to a negative source of potential, shown by way of example as −1250 v. D.C. Decoupling capacitors 98 and 100 are connected between the positive and negative potential sources, respectively, for taking transient ripples out of the sources which may be present from time to time. A voltage divider is connected between the negative source of potential and ground, said voltage divider comprising resistors 103, 104, 105, 106, 107, 108, 109, 110 and 111. The ends of resistors 103 through 110 having the higher negative potential thereon are connected to dynodes 83 through 90, respectively. Dynode 82 is connected to ground. The potential on the control dynode 81 is determined by the feed-back potential from the dynode voltage control circuit 35. The operation of the photomultiplier is such that the electrons emitted from cathode 94 are directed in sequence to dynodes 90 through 81 and then to plate 92. Multiplication of electrons is obtained from dynode to dynode. The plate potential is determined by the number of electrons emitted from the cathode which in turn depends on the intensity of the light viewed by the photomultiplier.

The plate output from the photomultiplier is coupled through a capacitor 112 to one end of a potentiometer 114, the other end of said potentiometer being connected to ground potential. The potential on the variable tap of the potentiometer is connected to the control grid of a triode 116. Adjustment of the potentiometer determines the static gain for the triode. A capacitor 118 is connected across the potentiometer to attenuate high frequency noise appearing in the photomultiplier signal. Triode 116 is provided with a cathode resistor 120, which connects to ground, and plate resistors 122 and 124, which connect to a positive source of potential, illustrated herein as +250 v. D.C. Decoupling capacitor 126 connects the common point between resistors 122 and 124 to ground potential in order to smooth out ripples appearing in the D.C. potential.

The input signal is amplified in triode 116, the plate output being coupled through a capacitor 128 to the control grid of a triode 130. Grid bias is obtained through resistor 132. Capacitor 134 attenuates high frequency noise signals appearing in the input signal. Triode 130 is furnished with a cathode resistor 136, which connects to ground, and plate resistor 138, which connects to the positive source of potential through a resistor 140 and decoupling capacitor 142.

The plate output of triode 130 is coupled through a capacitor 144 to the control grid of triode 146. The usual grid biasing resistor 148 and noise attenuating capacitor 150 are connected between the grid and ground. The input signal to the grid of triode 146 is clamped at ground potential by means of a vacuum diode 152, the cathode thereof being connected to the grid of the tube and the plate being connected to ground. Thus, the input signal appearing on the grid cannot go below ground. Triodes 116, 130 and 146, and their associated circuitry form the amplifier 31 previously referred to.

The plate of triode 146 is connected directly to a positive source of potential, illustrated herein as 150 v. D.C. The cathode is connected to ground through a resistor 154. The output from the triode is taken directly from the cathode and supplied to the plate of a diode 156. The cathode of the diode is connected through a capacitor 158 to the control grid of a triode 160. Reference is now made to Fig. 6*a* which shows a sample wave form appearing at point 6*a* in Fig. 2*b*. The voltage appearing at point 6*b* is shown in Fig. 6*b*. This voltage is determined by controlling the reference level at point 6*b* above which the voltage at point 6*a* must rise before 156 can conduct. The reference level is set by a potentiometer 161 whose slider is connected to ground potential along with one terminal of the potentiometer. The other terminal of said potentiometer is connected through a resistor 162 to point 6*b*. A noise attenuating capacitor 164 is connected across resistor 162. The point between resistor 162 and potentiometer 161 is connected between capacitor 166 and resistor 168, the last-named capacitor and resistor being connected in series between the positive voltage source and ground. The reference level, as shown in Fig. 6*b*, is determined by the position of the slider on potentiometer 161. Note that the blanking pulse in Fig. 6*a*, which is produced when the photomultiplier sees all black between scans, appears above the reference level as seen in Fig. 6*b*. It is this portion above the reference level which is used to vary the signal contrast amplitude.

The signal at point 6*c* appears on the control grid of triode 160. This signal is shown in Fig. 6*c*. A grid resistor 170 connects the grid to ground. A resistor 172 is connected between the cathode and ground and resistors 174 and 176 are connected between the plate and the positive source of potential. A decoupling capacitor 178 connects the point between resistors 174 and 176 to ground for eliminating ripples in the D.C. potential at said point. Capacitor 180 is used for coupling the output to a clamping circuit. Diode 156 and the circuitry associated therewith form the comparing circuit 32 and potentiometer 161 is the standard contrast amplitude source. Triode 160 provides amplification of the error signal.

The plate output of triode 160 is coupled through a capacitor 180 to the cathode of a diode 182, the plate of said diode being connected to ground. The arrangement is such that the amplified error signal is clamped to ground in such a manner that only positive going potentials are applied to the plate of diode 188. This action is shown in Fig. 6*d* for point 6*d*. The potential rises sharply and gradually falls away during the single scan time by reason of resistor 186. This is the error signal which is used for lowering the signal contrast amplitude to make it equal to the standard contrast amplitude.

The voltage appearing at point 6*d* is rectified and filtered through the diode 188 and the parallel connected capacitor 190 and resistor 192 which are connected between the cathode of the diode and ground. The signal at point 6*e*, as shown in Fig. 6*e*, is connected through a current limiting resistor 194 to the control grid of a pentode 198. Diodes 182, 188 and their associated circuitry form the detector 34.

The screen grid of pentode 198 is connected to a point between resistors 200 and 202, which, along with potentiometer 204, form a voltage dividing network connected between the positive potential source and ground. The cathode of the pentode is connected to the slider of potentiometer 204 so as to obtain a variable cathode bias. The slider is adjusted such that the output from the plate of pentode 198, which is the dynode control voltage, is a maximum under static conditions so as to give maximum gain to the amplifier for the poorest record contrast. A by-pass capacitor 208 is connected between the cathode and ground. The plate of pentode 198 is connected through resistors 206 and 210 to the positive source of potential. A decoupling capacitor 212 is connected to a point between the resistors 206 and 210 and to ground in order to eliminate ripples in the potential at this point. Capacitors 214 and 216 are connected in parallel with each other and with resistor 206 for averaging the feed-back control voltage controlled by the error signal. Pentode 198 and its associated circuitry form the dynode voltage control circuit 35.

It will be apparent that the rectified error signal shown in Fig. 6*e* results in a lowering of the plate potential of pentode 198 at point 6*f*, as shown in Fig. 6*f*. As the error signal potential increases, it decreases the potential on the control dynode 81 shown in Fig. 2*a*. This has the effect of lowering the gain of the photomultiplier so that over several cycles the signal contrast amplitude becomes equal to the standard contrast amplitude. Thus, signals produced in sensing data of a given density on different types and colors of background are substantially the same. That is, the signal height to background height remains substantially the same for said given density data regardless of background. Equalization is spread out over several scans to provide smoother operation. As shown in Figs. 6*a* through 6*c* the effect of the compensation during the first scan cycle shows up on the next scan. This is apparent since the signal at the beginning of the second scan cycle is lower than at the beginning of the first scan cycle.

Reference is now made to Fig. 3 which shows the details of the portion of Fig. 1*a* which have not as yet been described. The output from the video amplifier, taken from the cathode of triode 146, is direct coupled through a resistor 218 to the control grid of a pentode 220. This pentode and its associated circuitry form the data channel control circuit.

A capacitor 22 is connected between the grid of pentode 220 and point 225 to attenuate noise signals appearing in the signal to the grid. The cathode has a resistor 224 in parallel with a capacitor 226 connected to a point 225, the potential at point 225 being determined by the channel level control circuit which will be described at a later point in the description. The screen grid potential for pentode 220 includes resistors 228 and 230 connected between the positive source of potential and the cathode, the screen grid potential being obtained from the point between the two resistors.

The plate of pentode 220 is connected to a positive source of potential, herein illustrated as 150 v. D.C., through the plate resistor 232. The output potential from the plate of pentode 220 is connected to the control grid of a triode 234 through a voltage divider 236 and a current limiting resistor 237. The cathode of the triode is grounded and the plate is connected through the resistor 238 to the positive source of potential.

The plate output of triode 234 is connected to the control grid of a triode 240 through the voltage divider network 242 and current limiting resistor 244. Triode 240 is connected as a cathode follower with the plate connected directly to the positive potential source and the cathode connected to a negative source of potential through resistor 244.

The cathode output from triode 240 is connected to the recognition gate 40 and utilized as previously explained. It should be understood that the recognition gate 40 may take many forms. Logically speaking, it is a positive "and" circuit but from a structural standpoint it is identical with a negative "or" circuit. Thus, the recognition gate may be structurally similar to negative "or" circuit 62 except that the recognition gate requires only two diodes since it has only two inputs. The circuitry shown in Fig. 1*b* has been explained in sufficient detail to make its structure and operation apparent.

Referring to the channel level control circuit 72 in Fig. 3, pentodes 246, 248, 250 and 252 are utilized as constant current devices. The plates are all commoned and connected to a source of positive potential. The screen grids are all commoned and connected to the point between resistors 228 and 230 so as to obtain an operating potential. The cathodes are all commoned and connected to point 225 for use as cathode bias for the data channel control circuit. Point 225 is connected to ground through a potentiometer 254, the slider of the potentiometer being connected directly to ground. Adjustment of the slider can be made such that the lower limit for the data channel can be set for conditions where there is a lack of negative signals on lines.

The data channel can be lowered by turning off one or more of pentodes 246, 248, 250 and 252. These devices are normally on and are constant current devices. In order to turn pentodes 246 and 252 off, a negative signal must appear through current limiting resistors 256 and 258, respectively, from line 57. Pentode 248 is turned off by the application of a negative potential to the control grid thereof from line 64 through the current limiting resistor 260. Pentode 250 is turned off by the application of a negative potential to the control grid thereof from line 70 through the current limiting resistor 262.

Since all of devices 246, 248, 250 and 252 are constant current devices which are effectively connected in parallel, the turning off of one or more of the devices lowers the potential at point 225 by an incremental amount. When pentodes 246 and 252 are turned off together, the level at point 225 is lowered by a greater incremental amount than when just one of the pentodes is turned off. When all four of the pentodes are turned off, the potential at point 225 is lowered by an even greater amount.

Reference is made to Fig. 7*a* which shows a sample wave form obtained on the so-called prior scan of the digit "3" at the plate of pentode 220, as shown in Fig. 4. The data control channel is shown between the dotted lines. Fig. 7*b* shows how the data control channel level has been changed on the present scan. The effect of this lowering is to allow lower amplitude signals to pass through the data channel control circuit at times when data is anticipated. This shows how the present invention functions to bring out the horizontal characteristics of a character. It should be made clear that the lower dotted line of Fig. 7*b* represents the lower clipping level. In other words, the video data input must rise above this level in order to produce a signal from pentode 220. The characteristics of this pentode are such that the tube remains off by being biased to the potential at point 225. However, as soon as the grid potential exceeds this potential, the tube conducts heavily. Thus, a usable signal is obtained from the plate of the pentode any time this occurs.

Fig. 7*c* shows how the data channel level is lowered in scanning a character such as the digit "1" to bring out the vertical characteristics thereof. The upper and lower dotted lines indicate the data channel on a first scan in which vertical data is first produced. It should be noted that five sample times were required before the single increment lowering of the data channel was provided. The data signal was such that all of it would not have been picked up had the clipping level not been lowered. On the next scan the clipping is lowered just before the character data begins being picked up, since data was seen near this point on the prior scan, and then drops an even greater increment after five consecutive scans have occurred during which data is produced. This greater increment occurs since there is present both vertical and horizontal characteristics, the latter being due to the width of the vertical line which forms the digit "1."

From the above detailed description it will be seen that the present invention provides data control apparatus for processing the output of a light responsive device to provide reliable data for character recognition apparatus. The form of the character recognition apparatus for use with this invention may vary considerably. It should be understood that the present invention is not limited to use with scanning and recognition apparatus based on a vertical scan only. It is just as applicable to apparatus which makes a series of horizontal scans through the character. The data channel circuitry could remain the same. However, the negative "or" circuit 62 would detect vertical characteristics and the negative "and" circuit 50 would detect horizontal characteristics. In the case of a character recognition apparatus which scans along diagonal lines, the present apparatus will assist in picking up data having characteristics along the direction of scan as well as transversely thereto.

From the description given it becomes apparent that the present invention will produce data signals having a constant signal contrast amplitude when scanning data of the same density on different colored backgrounds or backgrounds having different reflectance characteristics. This does not mean that any character will produce signals of the same amplitude but it does mean that the background upon which the characters are placed, i.e., white, green, yellow, shiny, dull, etc., will not affect the amplitude of the signals obtained. This invention takes the data and stores it so that subsequently it may be used to anticipate the presence of data on a current scan. This allows the apparatus to look closer where there is a probability of data. At the same time it prevents picking up specks and paper defects in areas not containing data which would cause unreliable operation of a character recognition apparatus which is to use data.

Relative to the dynode control for the photomultiplier it should be made clear that more of the control dynodes could be disconnected from the voltage divider network and controlled by the feed-back signal instead. This depends on the degree of control of the photomultiplier which is desired.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A data handling circuit for receiving signals produced by a photoelectric device having varying intensities of light impinging thereon from a scanner which is scanning characters on a record medium having variable light reflectance characteristics, means coupled to said photoelectric device for altering the signals therefrom in a manner to provide modified signals having a substantially constant contrast amplitude between the record medium and portions of characters of given densities, a data channel connected to receive said modified signals, said data channel having a controllable level which allows those modified signals bearing a predetermined relationship thereto to pass through said channel, circuit means connected to receive the modified signals which pass through said channel for storing information relative thereto in a timed sequence, and means connecting said data channel and said circuit means for controlling the controllable level in said data channel in response to predetermined sequences of data in said circuit means.

2. A data handling circuit for photoelectric devices viewing varying intensities of light from a scanner which is successively scanning characters surrounded by a medium having varying light reflectance characteristics, means coupled to said photoelectric device for varying the gain of the photoelectric device so as to provide signals having a substantially constant contrast amplitude between said medium and portions of characters of given densities, a data channel having a variable level adapted to be controlled by a prediction signal, said data channel being connected to the first-mentioned means and arranged to receive the constant contrast signals and to allow those signals having a magnitude above said variable level to pass therethrough, and means connected to said data channel responsive to predetermined sequences of the signals passing through said channel for producing said prediction signal.

3. A data handling circuit for a photomultiplier viewing varying intensities of light provided by successively scanning characters on record means having varying reflectance characteristics, said photomultiplier device having a plate, a cathode and a plurality of dynodes including at least one control dynode, a contrast control circuit connected to said plate and comprising first means for providing a contrast signal having an amplitude which is a function of the difference in potential between the photomultiplier output when viewing said record means and when viewing a reference standard, second means connected to said first means for comparing said contrast signal with a standard contrast signal so as to develop an error signal, means for applying said error signal to said control dynode in a manner to adjust the gain of said photomultiplier until said contrast signal is substantially in equilibrium with said standard contrast amplitude, a data channel having a variable level adapted to be controlled by a prediction signal signal, said data channel being connected to receive the photomultiplier output signals and pass those signals which rise above said variable level, delay means connected to said data channel for storing information relative to the signals which pass through said data channel, and means connected to said delay means and responsive to signals produced after a predetermined delay for producing said prediction signal.

4. A data handling circuit for a photomultiplier viewing varying intensities of light provided by successively scanning characters on record means having varying reflectance characteristics, said photomultiplier device having a plate, a cathode and a plurality of dynodes including at least one control dynode, a contrast control circuit connected to said plate and comprising means for providing a contrast signal having an amplitude which is a function of the difference in potential between the photomultiplier output when viewing said record means and when viewing a reference standard, first means connected to said contrast control circuit for comparing said contrast signal with a standard contrast signal so as to develop an error signal, second means connected to said first means for applying said error signal to said control dynode in a manner to adjust the gain of said photomultiplier until said contrast signal is substantially in equilibrium with said standard contrast amplitude, and data channel means connected to said contrast control circuit having an automatic clipping level control for lowering the level when the presence of signals is anticipated so as to enhance the flow of information through said channel during these times.

5. A data handling circuit for photoelectric devices viewing varying intensities of light from a scanner which is successively scanning characters surrounded by a medium having varying light reflectance characteristics, means connected to said photoelectric device for varying the gain of the photoelectric device so as to provide signals having a substantially constant contrast amplitude between said medium and portions of characters of given densities, and data channel means connected to the first-mentioned means having an automatic clipping level control for lowering the level when the presence of signals is anticipated so as to enhance the flow of information through said channel during these times.

6. A prediction circuit comprising means for successively scanning a character along substantially parallel paths across the character, sensing means for providing output signals when portions of a character are sensed by the scanning means, and a data channel connected to said sensing means and arranged to receive said output signals, said data channel having an automatic clipping level control for varying the clipping level on a scan in response to signals which have passed through said data channel.

7. A prediction circuit comprising means for successively scanning a character along substantially parallel paths across the character, sensing means for providing output signals when portions of a character are sensed by the scanning means, and a data channel connected to said sensing means and arranged to receive said output signals, said data channel having an automatic clipping level control for varying the clipping level on a scan in response to signals which have passed through said data channel in the same scan in order to bring out characteristics of the character which extend along the path of the scanning means.

8. A prediction circuit comprising means for successively scanning a character along substantially parallel paths across the character, sensing means for providing output signals when portions of a character are sensed by the scanning means, and a data channel connected to said sensing means to receive said output signals, said data channel having an automatic clipping level control for varying the clipping level on a scan in response to signals which have passed through said data channel in a prior scan in order to bring out characteristics of the character which extend transversely of the path of the scanning means.

9. A prediction circuit comprising means for successively scanning a character along substantially parallel paths across the character, sensing means for providing output signals when portions of a character are sensed by the scanning means, and a data channel connected to said sensing means to receive said output signals, said data channel having an automatic clipping level control for varying the clipping level on a scan in response to signals which have passed through said data channel in a prior scan in order to bring out characteristics of the character which extend along the path of the scanning means.

10. A prediction circuit comprising means for successively scanning a character along substantially parallel paths across the character, sensing means for providing output signals when portions of a character are sensed by the scanning means, and a data channel connected to said sensing means to receive said output signals, said data channel having an automatic clipping level control for varying the clipping level on a scan in response to signals which have passed through said data channel in a prior scan in order to bring out data relative to characteristics of the character which extend along the path of the scanning means as well as transversely thereto.

11. A data handling circuit for character sensing apparatus comprising means for successively scanning a character along substantially parallel paths across the character, means including sensing means for providing output signals of given amplitudes relative to a standard when portions of a character of given densities are sensed by the scanning means, and a data channel connected to said sensing means to receive said output signals, said data channel having an automatic clipping level control for varying the clipping level on a scan in response to signals which have passed through said data channel.

12. A data handling circuit for character sensing apparatus comprising means for successively scanning a character on a record medium having varying reflectance characteristics along substantially parallel paths across the character, means including light responsive means for providing output signals having a constant contrast amplitude when said scanning means senses portions of a character of given densities, and a data channel connected to said light responsive means to receive said output signals, said data channel having an automatic clipping level control for varying the clipping level on a scan in response to signals which have passed through said data channel.

13. A data control circuit for receiving signals produced by a photoelectric device, said data control circuit comprising first means for passing intelligence-bearing portions of said signals which appear above a controllable level, multi-position storage means connected to said first means to receive information relative to the signals from said first means and to store said information in a timed sequence, and means connecting said first means and said storage means and responsive to the condition of predetermined positions of said storage means for varying said controllable level to permit the flow of lower level signals through said first means when the presence of signals is anticipated.

14. A data handling circuit for character sensing apparatus comprising means for successively scanning a character on a record medium having varying reflectance characteristics along substantially parallel paths across the character, circuit means including light responsive means for providing output signals having a constant contrast amplitude when said scanning means senses portions of a character of given densities, a data channel connected to said circuit means comprising first means for passing said output signals which appear above a controllable level, multi-position storage means connected to said first means to receive information relative to the signals from said first means and to store said information in a timed sequence, and means connected to said data channel and said storage means and responsive to the condition of predetermined positions of said storage means for varying said controllable level to permit the flow of lower level signals through said first means when the presence of signals is anticipated.

15. A data handling circuit for character sensing apparatus comprising means for successively scanning a character on a record medium having varying reflectance characteristics along substantially parallel paths across the character, circuit means including light responsive means for providing output signals having a constant contrast amplitude when said scanning means senses portions of a character of given densities, a data channel connected to said circuit means and comprising first means for passing said output signals which appear above a controllable level, multi-position storage means connected to said first means to receive information relative to the signal from said first means and to store said information in a timed sequence, and means connected to said data channel and said storage means and responsive to the condition of predetermined positions of said storage means for varying said controllable level on a scan in response to signals which have passed through said data channel on a prior scan.

16. A data handling circuit for signals from a light responsive device comprising a data channel connected to receive said signals, said data channel having predetermined signal transmission levels which will pass only those signals having an amplitude which exceeds said transmission levels, means connected to said data channel for selecting the signal transmission levels to be used comprising register means connected to said data channel and, gating means operative at intervals to pass signals which pass through said data channel to said register means, logical circuit means connected to said register means and said data channel and operative in response to predetermined conditions of said register means, and data channel control means governed by said logical means for controlling the signal transmission level in said data channel.

17. A data handling circuit for signals from a light responsive device comprising a data channel connected to receive said signals, said data channel having predetermined signal transmission levels which will pass only those signals having an amplitude which exceeds said transmission levels, means for selecting the signal transmission levels to be used comprising multi-position storage means, gating means connected to receive signals from said data channel and effective at timed intervals for providing pulses to said multi-position storage means when there is a signal from said data channel, means connected to said storage means for progressively advancing the data in said storage means, and means connected to said data channel and said storage means and responsive to the condition of predetermined positions of said storage means for determining the signal transmission level.

18. A data handling circuit for signals from a light responsive device comprising a data channel connected to said light responsive device to receive said signals, said data channel having predetermined signal transmission levels which will pass only those signals having an amplitude which exceeds said transmission levels, means connected to said data channel for selecting the signal transmission levels to be used comprising means responsive to the occurrence of a predetermined duration signal out of said data channel for lowering the signal transmission level of said data channel.

19. A signal clipping circuit connected to receive the output voltage from a photoelectric device, said signal clipping circuit being arranged to pass only that portion of the output voltage from said photoelectric device which exceeds predetermined voltage levels, a clipping control circuit for determining the range of voltage levels which said signal clipping circuit will pass, register means, gate means connected to said clipping control circuit and said register means and operative at predetermined intervals for passing the output from said signal clipping circuit to said register means, and logical circuit means connected to said clipping control circuit and said register means and operative in response to a predetermined condition of said register means, and data channel control means governed by said logical means for controlling said clipping control circuit to vary the voltage levels passed thereby.

References Cited in the file of this patent

UNITED STATES PATENTS

| | | |
|---|---|---|
| 2,412,423 | Rajchman et al. | Dec. 10, 1946 |
| 2,564,572 | Haynes | Aug. 14, 1951 |
| 2,583,143 | Glick | Jan. 22, 1952 |
| 2,596,741 | Tyler et al. | May 13, 1952 |
| 2,634,052 | Bloch | Apr. 7, 1953 |
| 2,663,758 | Shepard | Dec. 22, 1953 |
| 2,791,377 | Dell et al. | May 7, 1957 |
| 2,791,697 | Dell | May 7, 1957 |